(12) United States Patent
Socha et al.

(10) Patent No.: US 11,766,721 B2
(45) Date of Patent: Sep. 26, 2023

(54) THERMALLY DECOMPOSING BUILD PLATE FOR FACILE RELEASE OF 3D PRINTED OBJECTS

(71) Applicant: INDIUM CORPORATION, Utica, NY (US)

(72) Inventors: David P. Socha, Whitesboro, NY (US); James E. Hisert, Oriskany Falls, NY (US); Elizabeth Claire Hotvedt, Clinton, NY (US); Ross B. Berntson, New Hartford, NY (US)

(73) Assignee: INDIUM CORPORATION, Utica, NY (US)

( * ) Notice: Subject to any disclaimer, the term of this patent is extended or adjusted under 35 U.S.C. 154(b) by 396 days.

(21) Appl. No.: 16/998,650

(22) Filed: Aug. 20, 2020

(65) Prior Publication Data
US 2021/0053122 A1 Feb. 25, 2021

Related U.S. Application Data

(60) Provisional application No. 62/891,143, filed on Aug. 23, 2019.

(51) Int. Cl.
*B22F 10/00* (2021.01)
*B33Y 10/00* (2015.01)
(Continued)

(52) U.S. Cl.
CPC .............. *B22F 10/00* (2021.01); *B22F 12/30* (2021.01); *B33Y 10/00* (2014.12); *B33Y 30/00* (2014.12);
(Continued)

(58) Field of Classification Search
CPC ......... B33Y 10/00; B33Y 30/00; B33Y 40/00; B22F 12/30; B22F 10/66; B22F 10/64; B22F 10/28; B29C 64/40; B28B 1/001
See application file for complete search history.

(56) References Cited

U.S. PATENT DOCUMENTS

| | | | | |
|---|---|---|---|---|
| 5,980,812 A | * | 11/1999 | Lawton | B33Y 10/00 419/46 |
| 6,375,880 B1 | * | 4/2002 | Cooper | B33Y 70/00 264/318 |

(Continued)

FOREIGN PATENT DOCUMENTS

| | | |
|---|---|---|
| CN | 102921927 B | 6/2014 |
| CN | 108748993 A | 11/2018 |

(Continued)

OTHER PUBLICATIONS

Hendrixson, Stephanie, "Machining Module Automates 3D-Printed Part Removal," Modern Machine Shop, Additive Manufacturing, Dec. 6, 2017, 1 page, https://www.mmsonline.com/blog/post/machining-module-automates-3d-printed-part-removal.

(Continued)

*Primary Examiner* — Kevin E Yoon
*Assistant Examiner* — Ryan L Heckman
(74) *Attorney, Agent, or Firm* — Sheppard, Mullin, Richter & Hampton LLP

(57) ABSTRACT

Implementations of the disclosure are directed to thermally decomposable build plates that enable the facile release of 3D metal printed parts created by additive manufacturing. In some implementations, an additive manufacturing build plate comprises: a top surface, a bottom surface, and sidewalls comprised of a material, wherein the top surface, bottom surface, and sidewalls are dimensioned such that the build plate is useable in a 3D printing device; and a recessed section formed through the top surface, wherein the recessed section is configured to be filled with a solid metal or metal alloy to provide a surface for forming a 3D printed object in the 3D printing device.

10 Claims, 14 Drawing Sheets

(51) Int. Cl.
  B33Y 30/00 (2015.01)
  B33Y 40/00 (2020.01)
  B22F 12/30 (2021.01)
  B22F 10/28 (2021.01)
  B22F 10/64 (2021.01)
  B22F 10/66 (2021.01)
(52) U.S. Cl.
  CPC ............... *B33Y 40/00* (2014.12); *B22F 10/28* (2021.01); *B22F 10/64* (2021.01); *B22F 10/66* (2021.01)

(56) References Cited

U.S. PATENT DOCUMENTS

| | | | |
|---|---|---|---|
| 6,547,552 B1* | 4/2003 | Fudim | B29C 64/129 |
| | | | 264/401 |
| 6,830,643 B1* | 12/2004 | Hayes | B33Y 10/00 |
| | | | 156/289 |
| 9,321,215 B2 | 4/2016 | Dudley | |
| 2003/0065400 A1* | 4/2003 | Beam | C04B 35/638 |
| | | | 623/23.51 |
| 2004/0242728 A1* | 12/2004 | Xu | B29C 64/112 |
| | | | 523/160 |
| 2005/0156361 A1* | 7/2005 | Holowczak | C04B 35/626 |
| | | | 264/28 |
| 2007/0126157 A1* | 6/2007 | Bredt | B33Y 10/00 |
| | | | 425/375 |
| 2008/0042321 A1* | 2/2008 | Russell | B41J 2/165 |
| | | | 3215/4 |
| 2010/0252713 A1 | 10/2010 | Saito | |
| 2012/0018115 A1 | 1/2012 | Hovel et al. | |
| 2012/0156466 A1* | 6/2012 | Bell | C04B 35/83 |
| | | | 428/297.4 |
| 2014/0265034 A1 | 9/2014 | Dudley | |
| 2015/0145174 A1 | 5/2015 | Comb | |
| 2015/0258744 A1* | 9/2015 | Muller | B08B 7/028 |
| | | | 264/37.29 |
| 2015/0360287 A1* | 12/2015 | Zink | F23D 11/38 |
| | | | 419/53 |
| 2015/0367411 A1 | 12/2015 | Witmyer et al. | |
| 2016/0031010 A1 | 2/2016 | O'Neill et al. | |
| 2016/0082656 A1* | 3/2016 | Yu | B29C 64/295 |
| | | | 425/161 |
| 2016/0176118 A1 | 6/2016 | Reese et al. | |
| 2016/0332387 A1 | 11/2016 | Jondal et al. | |
| 2017/0252819 A1 | 9/2017 | Gibson et al. | |
| 2018/0043612 A1 | 2/2018 | Gray et al. | |
| 2018/0117854 A1* | 5/2018 | Hart | B29C 64/153 |
| 2018/0200800 A1 | 7/2018 | Hart et al. | |
| 2018/0236557 A1 | 8/2018 | Garay et al. | |
| 2019/0009332 A1 | 1/2019 | Rockstroh | |
| 2019/0030806 A1 | 1/2019 | Herman et al. | |
| 2019/0152143 A1 | 5/2019 | Fieldman et al. | |
| 2019/0160734 A1* | 5/2019 | Biesboer | B29C 64/124 |
| 2019/0177473 A1* | 6/2019 | Bashir | B29C 64/153 |
| 2019/0375014 A1* | 12/2019 | Kernan | B28B 1/00 |
| 2020/0001351 A1 | 1/2020 | Lin et al. | |
| 2020/0101534 A1* | 4/2020 | Gibson | B22F 3/1025 |

FOREIGN PATENT DOCUMENTS

| | | |
|---|---|---|
| CN | 109843554 A | 6/2019 |
| EP | 2986406 | 2/2016 |
| EP | 3424620 A1 | 1/2019 |
| EP | 3461572 A1 | 4/2019 |
| EP | 3084129 B1 | 5/2019 |
| EP | 3486008 | 5/2019 |
| JP | H09-216047 A | 8/1997 |
| JP | 2010-100883 | 5/2010 |
| JP | 2010100883 A | 5/2010 |
| JP | 5189953 B2 | 4/2013 |
| KR | 2010-0064195 A | 6/2010 |
| WO | WO 2017/152142 | 9/2017 |
| WO | WO-2017152142 A1 * | 9/2017 ........... B22F 1/0059 |
| WO | WO 2021/262679 | 12/2021 |

OTHER PUBLICATIONS

Lefky et al., "Dissolvable Supports in Powder Bed Fusion-Printed Stainless Steel," 3D Printing and Additive Manufacturing, vol. 4, No. 1 (2017), 11 pages, https://www.liebertpub.com/doi/pdfplus/10.1089/3dp.2016.0043.

StrataSys Press Release, "Pioneering a New Era in 3D Printed Production Metal Parts," Nov. 13, 2018, 4 pages, http://investors.stratasys.com/news-releases/news-release-details/pioneering-new-era-3d printed-production-metal-parts.

International Search Report and Written Opinion dated Nov. 3, 2020 for International Application No. PCT/US2020/047213, filed Aug. 20, 2020.

International Search Report and Written Opinion dated May 27, 2022 for International Application No. PCT/US2022/017546, filed Feb. 23, 2022.

International Search Report and Written Opinion dated Jun. 8, 2022 for International Application No. PCT/US2022/017529, filed Feb. 23, 2022.

European Examination Report—Communication pursuant to Article 94(3) EPC dated Jan. 10, 2023 for European Application No. 20767660.2.

Non-final Office Action dated Apr. 24, 2023 for U.S. Appl. No. 17/678,752, filed Feb. 23, 2022.

Non-final Office Action dated May 3, 2023 for U.S. Appl. No. 17/678,820, filed Feb. 23, 2022.

First Office Action dated May 17, 2023 for Chinese Application No. 202080071231.5.

International Search Report and Written Opinion dated May 26, 2023 for International Application No. PCT/US2023/016220, filed Mar. 24, 2023.

\* cited by examiner

THERMALLY DECOMPOSING BUILD PLATE FOR FACILE RELEASE OF 3D PRINTED OBJECTS

CROSS-REFERENCE TO RELATED APPLICATIONS

The present application claims the benefit of U.S. Provisional Patent Application No. 62/891,143 filed on Aug. 23, 2019 and titled "THERMALLY DECOMPOSING BUILD PLATE FOR FACILE RELEASE OF 3D PRINTED OBJECTS," which is incorporated herein by reference in its entirety.

DESCRIPTION OF THE RELATED ART 3D printing, also known as additive manufacturing, involves depositing print material into sequential layers onto a build plate until the desired 3D print is formed. 3D printing methods build parts layer by layer, but most require a platform or build plate to serve as the starting point. The first few layers of print material will bond onto the surface of the build plate, and the following layers build on this surface.

3D plastic printed parts may use plastic powder or plastic cord as feedstock, combined with a binder. A UV source or thermal treatment solidifies and shapes the object layer by layer. The final step is to remove the plastic 3D printed object from the build plate with a light force and/or some mild scraping.

3D metal printed parts are printed on a build plate. The feedstock is made of metal powders or combination of powders. The build plate is placed into the 3D printing machine. Once the machine is activated, a blade deposits a layer of metal powder over the build plate. A laser or series of lasers selectively sinters the metal that will become part of the 3D printed object. The first few passes of the laser essentially weld what will become the 3D printing object to the build plate. The blade then deposits new powdered metal across the surface of the build plate. Selective sintering is repeated and the object is created layer by layer.

Once the printing process is complete, the bond between the print material and the build plate will need to be broken for the printed object to be removed from the build plate. The bond between the print material and the surface of the build plate may make it difficult to separate the 3D printed object from the build plate following completion of the print process. To remove print material from the build plate, a user may be required to employ tools such as a band saw or wire electrical discharge machining (EDM) machine, or other means, to mechanically separate the print material from the build plate.

SUMMARY

Some implementations of the disclosure are directed to a thermally decomposable build plate that enables the facile release of 3D metal printed parts created by additive manufacturing.

In one embodiment, an additive manufacturing build plate comprises: a top surface, a bottom surface, and sidewalls comprised of a material, wherein the top surface, bottom surface, and sidewalls are dimensioned such that the build plate is useable in a 3D printing device; and a recessed section formed through the top surface, wherein the recessed section is configured to be filled with a solid metal or metal alloy to provide a surface for forming a 3D printed object in the 3D printing device.

In some implementations, the recessed section is a basin, wherein the basin comprises a drain hole for draining liquid out of the build plate. In some implementations, the drain hole extends through the bottom of the build plate.

In some implementations, the recessed section comprises the solid metal or metal alloy, wherein the solid metal or metal alloy has a solidus temperature that is lower than a solidus temperature of the material forming the top surface, bottom surface, and side walls of the additive manufacturing build plate. In some implementations, the solid metal or metal alloy is an insert configured to be snapped into the recessed section.

In some implementations, the basin is filled with the solid metal or metal alloy, wherein the solid metal or metal alloy has a solidus temperature that is lower than a solidus temperature of the material forming the top surface, bottom surface, and side walls of the additive manufacturing build plate.

In some implementations, the solid material forms a flat surface flush at top edges of the build plate basin.

In some implementations, the additive manufacturing build plate further comprises: a metal 3D object printed on a surface of the solid metal or metal alloy filling the basin, wherein the solid metal or metal alloy has a solidus temperature that is lower than a solidus temperature of the printed metal 3D object.

In some implementations, the additive manufacturing build plate comprises: a single part including the top surface, the bottom surface, and the sidewalls.

In some implementations, the additive manufacturing build plate comprises: a frame comprising an interior cutout smaller than the recessed section, the frame configured to retain the metal or the metal alloy during a 3D printing process; and a base comprising the recessed section, wherein the frame is configured be affixed on top of the base.

In one embodiment, an additive manufacturing system, comprises: a build plate, comprising: a top surface, a bottom surface, and sidewalls comprised of a material, wherein the top surface, bottom surface, and sidewalls are dimensioned such that the build plate is useable in a 3D printing device; and a recessed section formed through the top surface; and an insert of a solid metal or metal alloy that provides a surface for forming a 3D printed object in the 3D printing device, the insert dimensioned to be inserted into and secured within the recessed section.

In some implementations of the system, the solid metal or metal alloy has a solidus temperature that is lower than a solidus temperature of the material forming the top surface, bottom surface, and side walls of the additive manufacturing build plate.

In some implementations of the system, the build plate comprises: a frame comprising an interior cutout smaller than the recessed section, the frame configured to retain the insert during a 3D printing process, wherein the insert is dimensioned to be inserted into and secured within the recessed section and the interior cutout; and a base comprising the recessed section, wherein the frame is configured be affixed on top of the base.

In one embodiment, a method comprises: obtaining a build plate useable in a 3D printing device, the build plate comprising: a top surface, a bottom surface, and sidewalls comprised of a material; and a recessed section formed through the top surface; filling the recessed section with a liquid metal or metal alloy; and cooling the metal or metal alloy below its solidus temperature to form a solid, wherein the solid metal or metal alloy has a solidus temperature that is lower than a solidus temperature of the material forming the top surface, bottom surface, and side walls of the additive manufacturing build plate.

In some implementations, the recessed section is a basin comprising a drain hole extending through the bottom surface of the build plate, wherein filling the recessed section with the liquid metal or metal alloy comprises: placing a lid over the top surface of the build plate that extends beyond a top surface of the basin; inverting the build plate with the placed lid such that the drain hole is exposed; and pouring the liquid through the drain hole.

In some implementations, the method further comprises: printing a 3D printed object onto a surface of the solid metal or metal alloy to form an assembly, wherein the solid metal or metal alloy has a solidus temperature that is lower than a solidus temperature of the 3D printed object.

In some implementations, the 3D printed object is joined metallurgically to the metal or metal alloy during 3D printing.

In some implementations, the method further comprises: heating the assembly above the solidus temperature of the solid metal or metal alloy, thereby melting the metal or metal alloy and releasing the 3D printed object from the build plate.

In some implementations, the recessed section is a basin comprising a drain hole extending through the bottom surface of the build plate, wherein the melting metal or metal alloy drains through the drain hole.

In some implementations, the method further comprises: collecting, while the assembly is heated, the melting metal or metal alloy draining through the drain hole in a container.

In some implementations, the method further comprises: after draining the melting metal or metal alloy through the drain hole, refilling the recessed section with a refill liquid metal or metal alloy.

In some implementations, the refill liquid metal or metal alloy comprises the metal or metal alloy collected in the container.

In some implementations, the lid is comprised of a material that does not form a bond with the metal or metal alloy.

In some implementations, the method further comprises: removing the lid, thereby exposing a solid phase metal or metal alloy that provides a build surface for a 3D metal printed object.

In one embodiment, a method comprises: obtaining a build plate useable in a 3D printing device, the build plate comprising: a top surface, a bottom surface, and sidewalls comprised of a material; and a recessed section formed through the build plate; and securing, within the recessed section, an insert of a solid metal or metal alloy, wherein the solid metal or metal alloy has a solidus temperature that is lower than a solidus temperature of the material forming the top surface, bottom surface, and side walls of the additive manufacturing build plate.

In some implementations, the method further comprises: after securing the insert, positioning the build plate within a 3D printing device, printing, using the 3D printing device, a 3D printed object onto a surface of the insert; and after printing the 3D printed object, removing the insert with the 3D printed object from the recessed section of the build plate.

In some implementations, the method further comprises: after securing the insert, positioning the build plate within a 3D printing device; printing, using the 3D printing device, a 3D printed object onto a surface of the insert, wherein the solid metal or metal alloy has a solidus temperature that is lower than a solidus temperature of the 3D printed object; and after printing the 3D printed object, melting the insert to release the 3D printed object from the build plate.

In some implementations, the build plate comprises: a frame comprising an interior cutout smaller than the recessed section, the frame configured to retain the metal or the metal alloy during a 3D printing process; and a base comprising the recessed section; and securing the insert, comprises: securing a bottom part of the insert in the recessed section; and after securing the bottom part of the insert: securing a top part of the insert in the interior cutout of the frame; and affixing the frame on top of the base.

In one embodiment, a method comprises: obtaining a plate of a solid metal or metal alloy; securing the plate in a 3D printing system; after securing the plate, printing, using the 3D printing system, a 3D printed object onto a surface of the plate to form an assembly, wherein the solid metal or metal alloy has a solidus temperature that is lower than a solidus temperature of the 3D printed object. In some implementations, the 3D printed object is joined metallurgically to plate during 3D printing. In some implementations, the method further comprises: heating the assembly above the solidus temperature of the solid metal or metal alloy, thereby melting the plate and releasing the 3D printed object from the plate. In some implementations the plate includes holes (e.g., screw holes on the corners or some other part of the plate) or some other means for securing it to the 3D printing system during 3D printing.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

Figure 1:
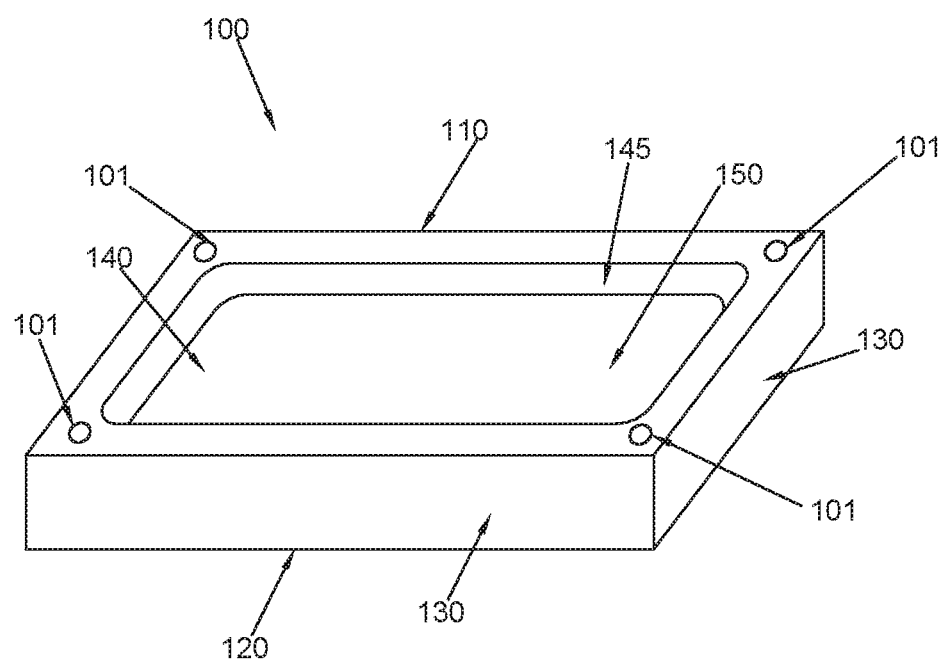
FIG. 1 shows a perspective view of a build plate that can be used for 3D printing in accordance with implementations of the disclosure.

The figures are not exhaustive and do not limit the present disclosure to the precise form disclosed.

DETAILED DESCRIPTION OF THE EMBODIMENTS

There is a need for improving techniques in additive manufacturing for removing workpieces that are essentially welded to a build plate. One challenge is to free the parts without damaging them, but also to protect the build plate so that it can be reused. As noted above, mechanical means, such as by use of a bandsaw or wire EDM, are typically employed to cut and remove a 3D printed from a build plate outside of the 3D printer. The build plate may then be machined separately to remove excess material and return them to a usable state. Such separation techniques, however, may be problematic.

Current mechanical removal approaches may lead to damage of the 3D printed part, damage to the surface of the build plate, and/or injury to the user. First, mechanical removal of the part by cutting may require hours of post processing to bring the 3D printed part back to its desired shape. Second, by cutting the 3D printed part away from the build plate, a portion of the welded part (post) requires grinding to remove that remaining piece from the build plate and to return the build plate to a smooth surface for reuse. This process of ensuring that all printed material is removed from a build plate before beginning a new printing process may be tedious and time consuming, as well as potentially harmful to the build plate. Moreover, mechanical removal techniques such as using a bandsaw or wire EDM require 3D printed parts to have a standoff between the part and the build plate to allow access for the band saw or wire EDM clearance, which requires additional, consumable metal powder.

Although not taught for removal of 3D metal printed/laser sintered parts from a build plate, a chemical removal method has been proposed for separating 3D printed support structures from a 3D printed object. By applying this method, certain areas of a metal additive manufacturing part react chemically when immersed in a corrosive solution. The technique involves a controlled degradation that eats away at the supports while leaving actual part virtually intact. This process may use sodium hexacyanoferrate as a sensitizing agent. Although this chemical etching process of support and part removal may reduce the removal and post processing time of traditional machining, it relies on the application of corrosive chemicals.

To address the aforementioned deficiencies of the art, the present systems and methods described in the disclosure are directed to simplifying 3D printed object removal from a build plate without the use of expensive saws, complex machines, or harsh chemicals. In accordance with implementations of the disclosure, a thermally decomposable build plate may enable the facile release of 3D metal printed parts created by additive manufacturing. During 3D metal printing or laser sintering, a print material may bond onto a surface of the build plate having a lower melting temperature than the print material and the rest of the build plate. Once the printing process is completed, the assembly may be treated with heat, thereby melting the bond surface between the 3D printed object and the build plate, and releasing the 3D printed object.

In contrast to mechanical removal of a 3D printed metal part that often necessitates hours of post processing to reshape and polish the bottom of the object and to resurface the build plate for reuse, by applying the systems and methods described herein, a facile removal of a 3D printed object from a build plate may be enabled without damage to the 3D printed part. Little or no post processing, finishing, reshaping, and/or polishing the 3D printed object may be needed by applying the 3D printed part removal systems and methods disclosed herein. Moreover, by virtue of applying the systems and methods described herein, object removal from a build plate may be accelerated without the use of corrosive chemicals, thereby offering a user additional time and cost-savings in additive manufacturing.

FIG. 1 shows a perspective view of a build plate 100 that can be used for additive manufacturing or 3D printing in accordance with implementations of the disclosure. As shown, build plate 100 includes a top surface 110, a bottom surface 120 and four sidewalls 130 that extend between the top and bottom surfaces. The build plate 100, including the top, bottom, and side surfaces, may be made of copper, stainless steel, tool steel, tin, aluminum, cemented carbide, ceramic, graphite, or some other suitable material. In particular, as further described below, the build plate 100 may be made of material (e.g., metal or metal alloy) having a solidus temperature that is substantially higher (e.g., at least 30° C.) than that of a thermally decomposable material that is placed or formed in its recessed section 140, and used to create a bond between build plate 100 and a 3D printed object during 3D printing. For example, the build plate 100 may have a melting temperature that is greater than 1000° C.

Although depicted in the shape of a rectangular prism or cuboid having sidewalls that extend perpendicularly between the top surface 110 and bottom surface 120, it should be noted that in other implementations build plate 100 may be some other suitable shape, e.g., a trapezoidal prism, that may be used to implement the 3D printing techniques described herein.

In this example, means for attachment of build plate 100 to a 3D printing apparatus are represented by slots or holes 101 (e.g., bolt holes) in each corner of top surface 110. Structural protrusions (e.g., bolts or tabs) of the 3D printing apparatus may be inserted into holes 101 to hold the build plate 100 in place during 3D printing. Although holes 101 are illustrated in each corner of top surface 100, it should be appreciated that depending on the implementation, build plate 100 may include holes 101 and/or protrusions in any suitable location on top surface 110, bottom surface 120, and/or other surface of build plate 100 to facilitate attachment to the 3D printing apparatus. In some implementations, holes 101 may be included on bottom surface 120 and not on top surface 110 to prevent powdered metal from 3D printing to fall into holes 101.

As depicted, build plate 100 includes a mortised or recessed section 140 extending through its center. The recessed section 140 is illustrated as having surfaces 145 (e.g., sidewalls) and a lower surface 150. As further described below, the recessed section 140 may be filled with a lower melting temperature metal or metal alloy that provides a thermally decomposable surface for building a 3D printed object.

Figure 2A:
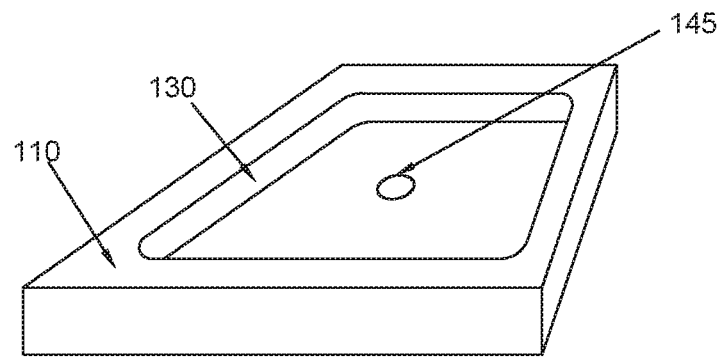
FIG. 2A shows an angled view of a build plate, in accordance with implementations of the disclosure.
Figure 2B:
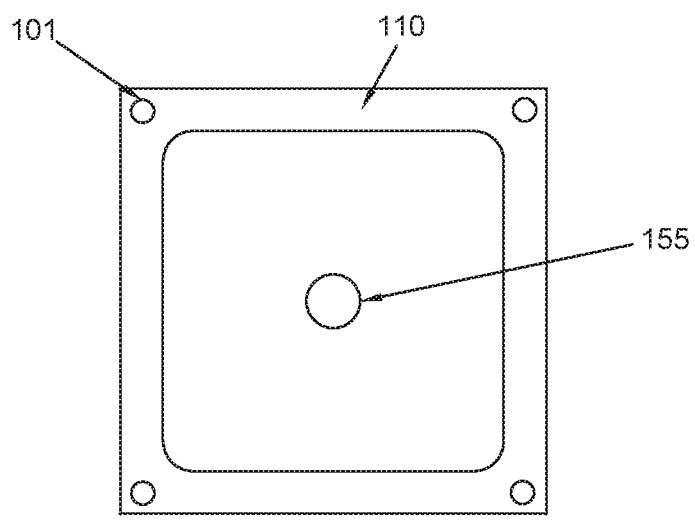
FIG. 2B shows a top view of the build plate of FIG. 2A.
Figure 2C:
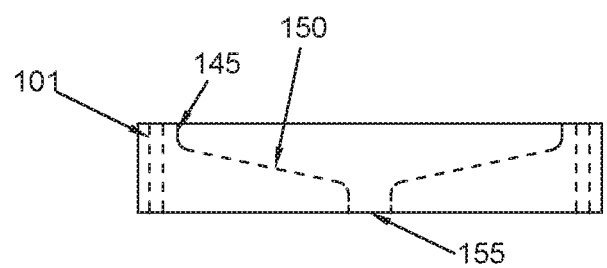
FIG. 2C shows a side view of the build plate of FIG. 2A.

The recessed section 140 may be in the form of a basin with a drain hole that extends all the way through the build plate 100 (e.g., from top surface 110 through bottom surface 120). This is depicted by FIGS. 2A-2C, which respectively show angled, top, and side views of build plate 100, including a recessed section 140 with a drain hole 145. As shown, the recessed section 140 is in the form of a basin that slopes downward toward hole 145 that extends out the bottom of build plate 100, thereby permitting a material (e.g., liquid metal) to be drained out of build plate 100. In FIG. 2C, the dashed outlines depict the corner holes 101, drainage hole 155, and basin shapes. The bottom edges of the basin leading to the drainage hole are sloped in this example.

It should be appreciated that although the examples of the disclosure show the lower surface of recessed section 140 sloping down at an acute angle toward a centered, circular hole 145, other basin constructions, slope angles, hole locations, and hole shapes may be utilized. For example, in some implementations, the recessed section may be implemented by perpendicularly sloping its sides into a flat bottom having a hole. In some implementations, the hole 145 may positioned off center (e.g., close to one of the corners of build plate 100). In some implementations, the hole 145 may instead drain through a side wall 130 of build plate 100. In some implementations, the hole 145 may be rectangular or square.

The recessed section 140 may be formed via any suitable machining process such as by using a morticing machine, a metal lathe, a milling machine, a drill, etc. For example, the recessed section 140 may be formed by morticing a solid block of metal. Depending on the implementation, the top perimeter and average depth of recessed section 140 may be optimized for the 3D printing device and process used with build plate 100. For example, the perimeter of the cutout may be shaped such that it does not interfere with a 3D printing device securing mechanism (e.g., providing sufficient space for holes 101) while providing a large enough surface area to form a 3D printed object. In some implementations, sufficient depth may be provided to optimize cooling and provide fora deeper channel.

Figure 3A:
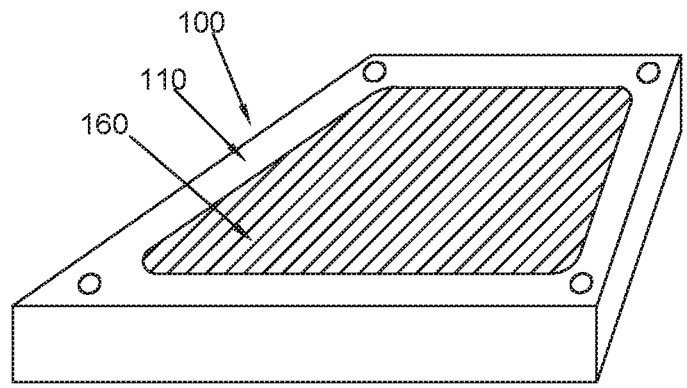
FIG. 3A shows an angled view of a build plate filled by a solid material, in accordance with implementations of the disclosure.
Figure 3B:
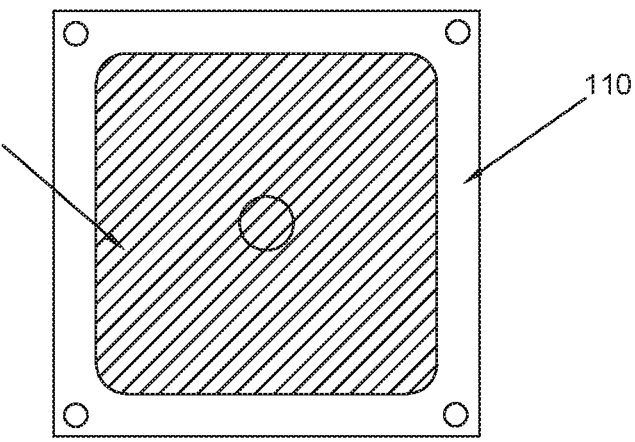
FIG. 3B shows a top view of the build plate of FIG. 3A.
Figure 3C:
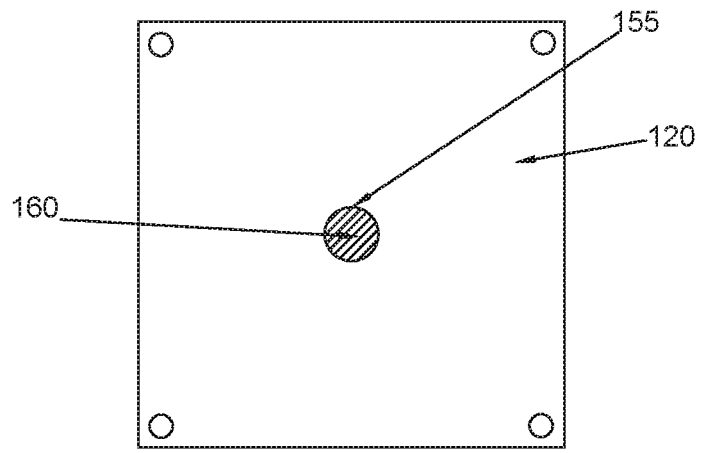
FIG. 3C shows a bottom view of the build plate of FIG. 3A.

FIGS. 3A, 3B, and 3C respectively show angled, top, and bottom views of a build plate 100 filled by a solid material 160. As depicted in this example, the material filling recessed section 140 forms a flat surface flush to the top edges of the recessed section. As shown by the bottom view in FIG. 3C, the solid material 160 filling the recessed section 140 is visible through the drainage hole 155. Although in this example, the solid material 160 forms a flat surface flush at the top edges of the build plate basin, in other implementations it may lie below the top edges of the build plate basin.

In implementations, the solid material 160 is a solid metal or metal alloy having a melting point lower than that of the material (e.g., metal) of the unfilled build plate 100. The solidus temperature of the metal or metal alloy may be at least 30° C. lower than that of the build plate 100. In some implementations, the differences in melting point may be more significant. For example, in some implementations the solidus temperature of the metal or metal alloy may be at least 50° C. lower, 100° C. lower, 200° C. lower, 400° C. lower, 600° C. lower, 800° C. lower, 1000° C. lower, or even more than 1000° C. lower than the solidus temperature of the build plate 100.

In some implementations, the solid material 160 is a solid metal or metal alloy having a solidus temperature of less than 300° C. In some implementations, it has a solidus temperature between 50° C. and 250° C. For example, the solid material 160 may be a solder alloy such as tin alloys (e.g., 96.5Sn3Ag0.5Cu), bismuth alloys (e.g., 58Bi42Sn) or indium alloys (e.g., 52In48Sn). In other implementations, the solid material 160 may be a single elemental metal such as tin, bismuth, indium, or others.

Figure 4A:
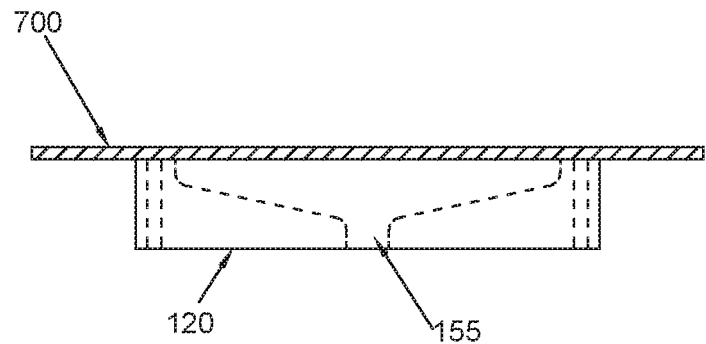
FIG. 4A depicts an example of a method of forming solid material in a recessed section of build plate, in accordance with implementations of the disclosure.
Figure 4B:
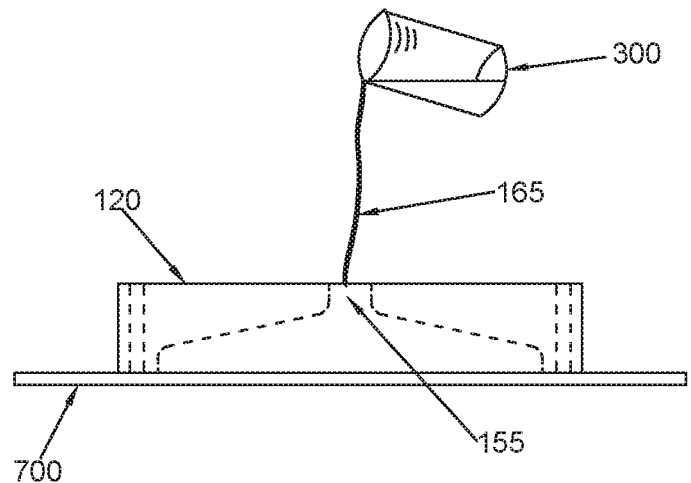
FIG. 4B depicts an example of a method of forming solid material in a recessed section of build plate, in accordance with implementations of the disclosure.

FIGS. 4A-4B depict one particular example of a method of forming solid material 160 in a recessed section 140 of build plate 100, in accordance with implementations of the disclosure. As depicted by FIG. 4A, which shows a side view of plate 100, a flat plate or lid 700 covers the top surface of build plate 100, extending beyond the edges of recessed section 140 and the top surface 110 of build plate 100. In other implementations, lid 700 may extend up to or just beyond the edges of recessed section 140. Lid 700 may be held in place using clamps or other suitable mechanical means to create a seal. The material of lid 700 may be comprised of a material such that it does not bond with build plate 100 but may be mechanically held in place to create an enclosed mold. For example, graphite, polytetrafluoroethylene, ceramic, cemented carbide, copper, stainless steel, tool steel, tin, aluminum, or some other suitable material may be used. The material of build plate 100 may be the same as or different from the material of lid 700.

After the lid 700 covers the top surface of build plate 100, the build plate 100 and lid 700 may be inverted, and the recessed section 140 may be filled through drain 155. In particular, FIG. 4B illustrates a side view of the inverted build plate 100 and lid 700. A container 300 may be used to pour a liquid 165 of material (e.g., metal or metal alloy) through drainage hole 155 onto lid 700, filling the recessed section 140. Prior to this step, the metal or metal alloy may be heated above its solidus temperature to form liquid 165. In some implementations, the use of a basin with acutely sloped sides may prevent the formation of air pockets when adding a liquid metal 165 through hole 155.

In this example implementation, by virtue of adding the liquid metal 165 through hole 155 with the assembly inverted, any unwanted accumulates (e.g., dross) may float to and settle at the top of the filled recessed section (i.e., where hole 155 is), thereby ensuring a clean metal or metal alloy surface is formed where 3D printing occurs.

Once the recessed section 140 is filled, the assembly may be cooled, causing liquid 165 to solidify (e.g., to form a solid material 160). Thereafter, the lid 700 may be removed to expose a smooth, solid phase metal or metal alloy that provides a build surface for a 3D metal printed object. To facilitate removal of lid 700 and ensure a smooth surface is formed (e.g., a flat surface flush to the top edges of the build plate recess), the lid 700 may be comprised of a material, e.g. graphite, polytetrafluoroethylene, ceramic, copper, stainless steel, tool steel, tin, aluminum, a non-stick metal, or some material that does not bond with liquid 165, before or after the liquid 165 solidifies.

It should be appreciated that although FIGS. 4A-4B depict one example technique for forming a solid material 160 in a recessed section 140 of a build plate 100 to provide a surface for a 3D printed object, other techniques are possible. For example, in some implementations a liquid metal or metal alloy may instead be poured from the opposite side, through the top surface of recessed section 140, first filling drain 155. In such implementations, a lid 700 may instead cover drain 155. In yet other implementations, drain 155 may be on the side of build plate 155 (e.g., through a side wall 130), in which case the liquid metal or metal alloy may be poured through the side wall.

Figure 9A:
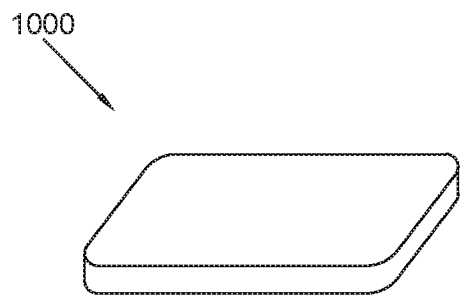
FIG. 9A depicts an insert that may be secured in a recess of a build plate, in accordance with implementations of the disclosure.
Figure 9B:
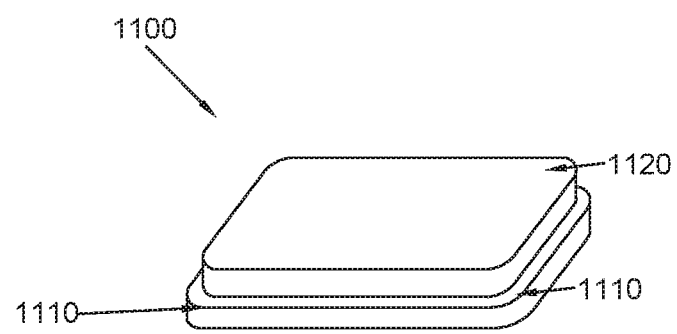
FIG. 9B depicts another insert that may be secured in a recess of a build plate, in accordance with implementations of the disclosure.

In other embodiments, the solid material 160 may be a pre-shaped solid insert that may be snapped or otherwise secured into or out of recessed section 140. The insert may be dimensioned such that it fits securely (e.g., occupies substantially all of the open volume) within the recessed section. In such instances, multiple duplicate molds of the solid insert may be formed, with each mold being utilized during a 3D printing process. By way of illustration, FIGS. 9A-9B illustrate inserts that may be used in accordance with implementations of the disclosure. FIG. 9A shows an insert 1000 that may be secured in a recess of a single piece build plate that has a rectangular recessed section. FIG. 9B shows an insert 1100 that may be secured in a two-piece build plate 200, further discussed below.

A snap-in insert of solid material 160 obviates the requirement that an operator of the 3D printing system performs the labor-intensive process of casting the liquid metal 165 in advance, to form solid material 160 in the recessed section 140 of build plate 100. As such, additive manufacturing throughput may be significantly improved on the operator side by utilizing preformed, snap-in inserts. Additionally, the snap-in inserts may make operation of the 3D printing system more convenient and simpler for the operator. When an operator completes 3D printing onto a solid material 160, as described herein, the operator may snap the insert of solid material 160 out, and subsequently melt the insert to retrieve the 3D printed object. For example, the insert may be snapped out by using a rod or other suitable tool to apply pressure to the insert via hole 155. A throughput advantage that may be realized from snapping out the insert with the 3D printed object is that the operator may quickly resume printing the next 3D metal printed object by snapping in a new insert 160. In some implementations where inserts are utilized, build plate 100 may not include hole 155, and some other suitable technique may be utilized to snap the insert out. Alternatively, the insert may be removed by melting it while it is still attached to build plate 100, and collecting the liquid metal via drain hole 155 as further described below with reference to FIG. 7.

In some implementations, an operator may be supplied a container in which to place an insert (with the 3D printed object) prior to melting. The container may be sent back to the manufacturer of the solid insert (or some other party) to recycle the metal/metal alloy or reuse the metal/metal alloy to create a new insert (e.g., for the same user or a different user).

Figure 5:
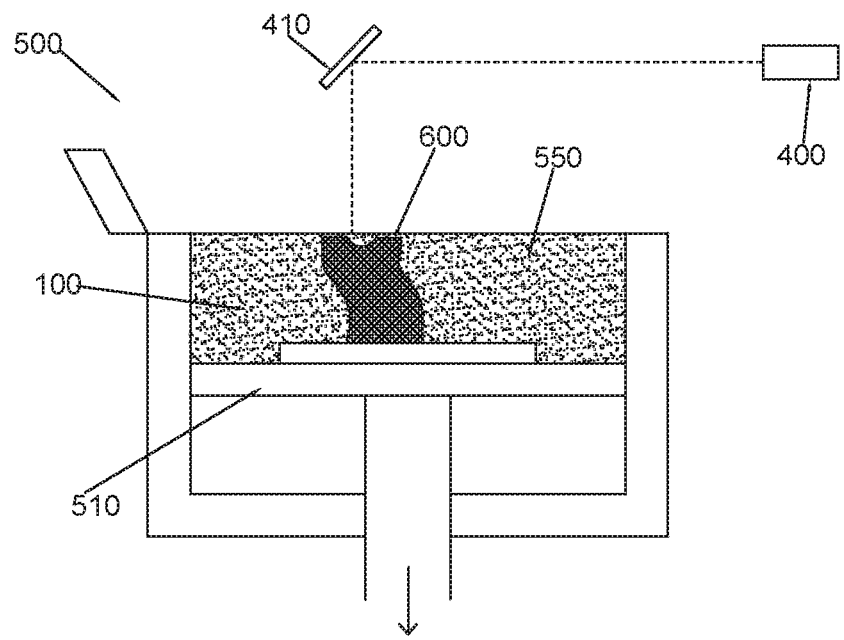
FIG. 5 illustrates a 3D metal printing process including a 3D metal printing device using a metal powder bed and a laser to form a 3D printed object on a build plate, in accordance with implementations of the disclosure.

FIG. 5 illustrates a 3D metal printing process including a 3D metal printing device 500 using a metal powder bed 550 and a laser 400 to form a 3D printed object 600 on a build plate 100, in accordance with implementations of the disclosure. Also shown is build plate loading platform 510 and optical component 410 for directing the output of a laser 400. The metal powder bed 550 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy for forming 3D printed object 600. The 3D printed object may be laser sintered. Prior to beginning printing, a build plate 100 having a top surface including a region with a low melting temperature metal or metal alloy (e.g., top surface of solid material 160 filling a recessed section 140 as depicted by FIGS. 3A-3C) may be loaded into the 3D metal printing device 500. For example, build plate 100 may be placed on a platform 510 of device 500.

At the start of printing, a first layer of metal powder may be deposited (e.g., using a doctor blade or wiper blade) over the top surface of build plate 100, including solid material 160. Laser 400 or a series of lasers may then lase/sinter the deposited metal powder, causing the first layer of 3D printed object 600 to be metallurgically joined to the solid material. Thereafter, additional layers of powdered metal may be deposited by metal powder bed 550 and 3D printed object 600 may be created layer by layer. The device 500 may include a lowering mechanism (e.g., as part of platform 510) apparatus to allow for subsequent metal layers of the 3D printed object 600 to be formed. As the apparatus and build plate are lowered, a metal powder layer may be added to the top surface and a laser or laser(s) used to selectively join/sinter areas to the 3D printed object 600 below. At the completion of the aforementioned 3D printed process, build plate 100 with 3D printed object 600 may be removed from 3D printing device 500.

The melting temperature of the metal or metal alloy that is used to form 3D printed object 600 is higher than that of the solid material 160. For example, similar to the build plate 100, the solidus temperature of the 3D printed object 600 may be at least 30° C. higher than the solidus temperature of the metal or metal alloy. In some implementations, the differences in melting point may be more significant. For example, in some implementations the solidus temperature of the 3D printed object 600 may be 50° C. higher, 100° C. higher, 200° C. higher, 400° C. higher, 600° C. higher, 800° C. higher, 1000° C. higher, or even more than 1000° C. higher than the solidus temperature of the metal or metal alloy of solid material 160. In some implementations, the metal powder used to form 3D printed object 600 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy.

It should be noted that although 3D printing may occur at room temperature, the heat generated by laser 400 may increase the temperature of solid material 160. To prevent premature melting of material 160 during 3D printing, this increase in temperature may be accounted for when selecting a suitable metal or metal alloy 160. In some implementations, the power of laser 400 may be decreased while forming lower layers of 3D printed object 600 to prevent overheating of material 160 during 3D printing.

Figure 6:
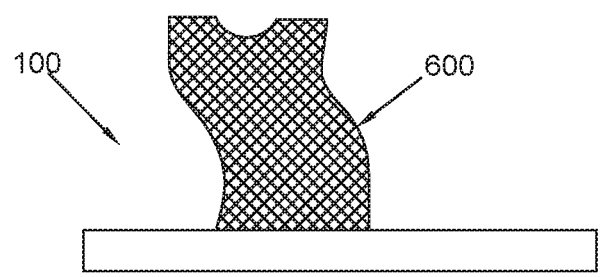
FIG. 6 shows an assembly including a metal 3D printed object metallurgically joined onto a build plate after the completion of 3D printing, in accordance with implementations of the disclosure.

FIG. 6 shows an assembly including the metal 3D printed object 600 metallurgically joined onto build plate 100 after the completion of 3D printing. In particular, the 3D printed object 600 may be joined to a surface of build plate 100 containing a low melting temperature solid material 160, as described above.

Figure 7:
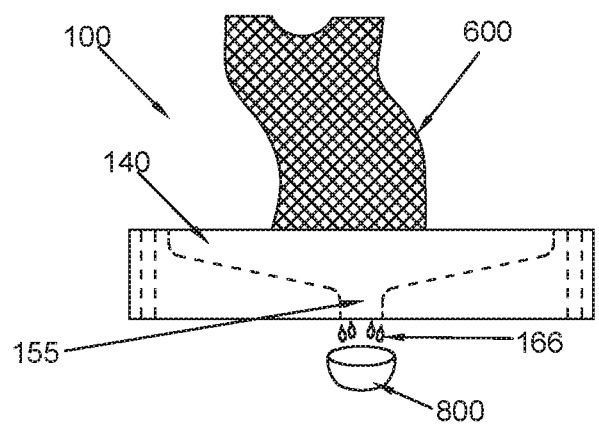
FIG. 7 shows a side view in which a low melting temperature metal or metal alloy filling a recessed section of a build plate is melting and draining through a drain hole into a collection apparatus while a 3D printed object and the build plate remain solid, in accordance with implementations of the disclosure.

Following 3D printing, the 3D printed object 600 is separated from build plate 100. To this end, the assembly may be heated (e.g., by placing the assembly in an oven) to a temperature above the solidus temperature of the low melting temperature solid material 160, thereby melting away the material and releasing the 3D printed object. The heat source is not limited to that of an oven. In other implementations, the 3D printed object 600 may be thermally separated from the solid material 160 by a heat source other than an oven such as by blow torch, heated air, heated liquid, hotplate, laser, or any other suitable heat source sufficient to melt the solid material 160, thereby releasing the 3D printed object 600. FIG. 7 shows a side view in which the low melting temperature metal or metal alloy filling the recessed section 140 of the build plate 100 is melting and draining (shown as melting liquid 166) through the drain hole 155 into container or collection apparatus 800 while the 3D printed object 600 and the remaining structure of build plate 100, including recessed section 140, remain solid. During this removal process, the 3D printed object 600 may be held in place by a tool. In some implementations, this process may be incorporated into a compartment of a 3D printing assembly. In an alternate separation method, prior to applying heat, a thin object such as a punch may be placed though drain hole 155 on the underside of build plate 100 with significant pressure to release the solid metal insert 160, with the 3D printed object 600 still attached, from the recessed section 140. The aforementioned combination may be placed into a container with a heated medium or subjected to other thermal treatment to cause the separation of solid metal insert 160 from 3D printed object 600. This separation method may be implemented on a preformed insert as described above, or on a solid material 160 formed via casting by the operator as described in FIGS. 4A-4B.

In this example, by virtue of having a collection apparatus 800 to collect the liquid metal or liquid metal alloy 166 during the phase change from solid to liquid, the collected metal or metal alloy may be reused to refill the recessed section 140 for future 3D printing operations. For example, the collected metal or metal alloy may be used to fill recessed section 140 as described above with reference to FIGS. 4A-4B, in preparation for printing a new 3D object. In another embodiment, the solid material 160 may be a pre-shaped solid insert as discussed above, which can be snapped into or out of recessed section 140, eliminating the need to repour liquid metal into the mold for the next printing.

Figure 8:
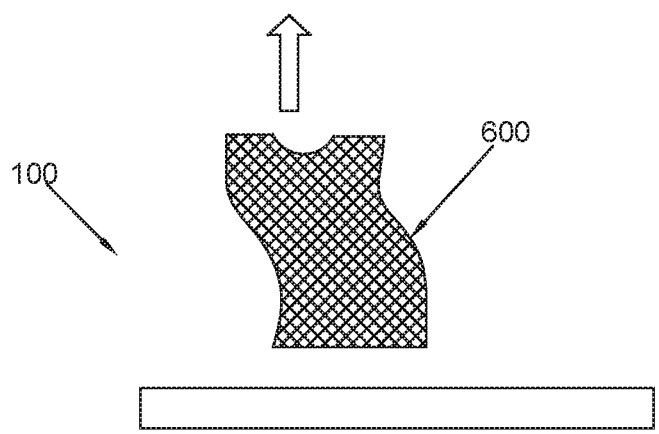
FIG. 8 depicts a 3D printed object after being separated from a build plate once the material filling recessed section is no longer solid and melted away, in accordance with implementations of the disclosure.

FIG. 8 depicts the 3D printed object 600 after being separated from build plate 100 once the material filling recessed section 140 is no longer solid and melted away. In some implementations, after separation of the 3D printed object 600, the collected metal or metal alloy may be used to refixture the object 600 for polishing, reshaping, and/or grinding, as needed. For example 3D printing parts may be held using a clamping mechanism for post processing. The lower melting point material 160 may be used to secure the 3D printed object 600 into a vice or clamping mechanism while performing the post processing functions above, so that the clamp does not contact the part 600 directly.

Figure 10:
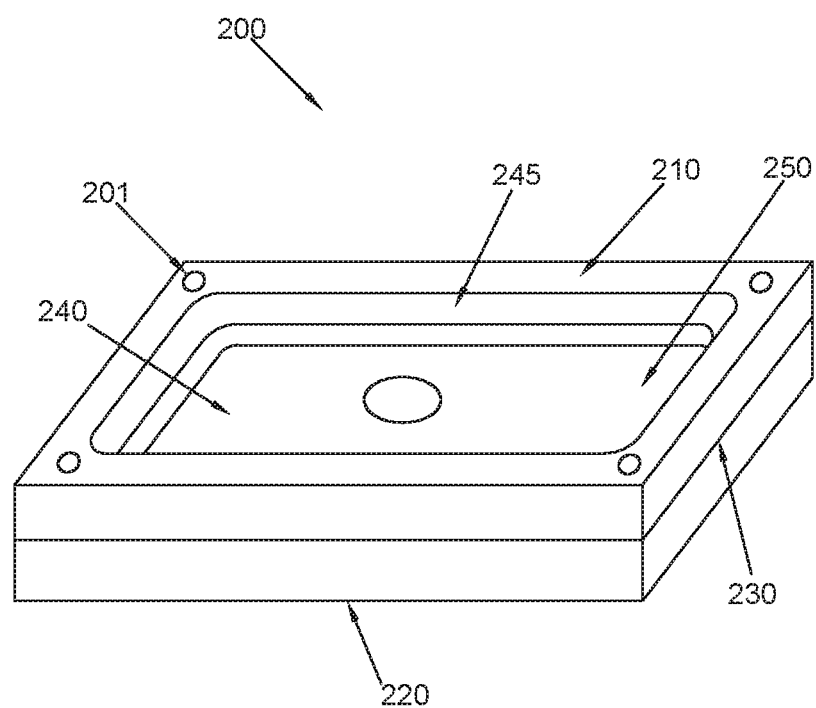
FIG. 10 shows a perspective view of a two-part build plate that can be used for 3D printing in accordance with implementations of the disclosure.

FIG. 10 shows a perspective view of an alternate, multi-part build plate 200 that may be used for additive manufacturing or 3D printing, in accordance with implementations of the disclosure. As shown, build plate 200 includes a top surface 210, a bottom surface 220 and four sidewalls 230 that extend between the top and bottom surfaces. The build plate 200, including the top, bottom, and side surfaces, may be made of copper, stainless steel, tool steel, tin, aluminum, cemented carbide, ceramic, graphite, or some other suitable material. In particular, the multiple parts of the build plate 200 may be made of material (e.g., metal or metal alloy) having a solidus temperature that is substantially higher (e.g., at least 30° C.) than that of a thermally decomposable material that is placed or formed in its recessed section 240, and used to create a bond between build plate 200 and a 3D printed object during 3D printing. For example, the parts of build plate 200 may have a melting temperature that is greater than 1000° C.

Figure 11:
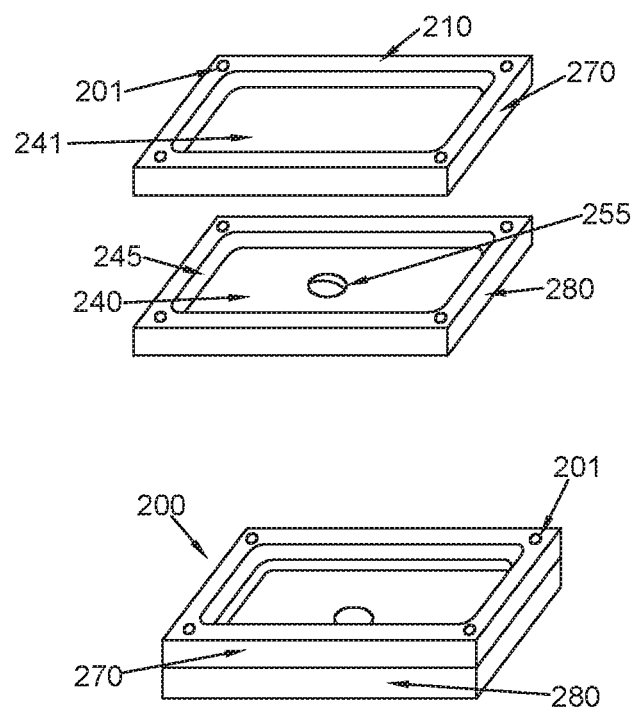
FIG. 11 shows an exploded view of the build plate of FIG. 10.
Figure 12:
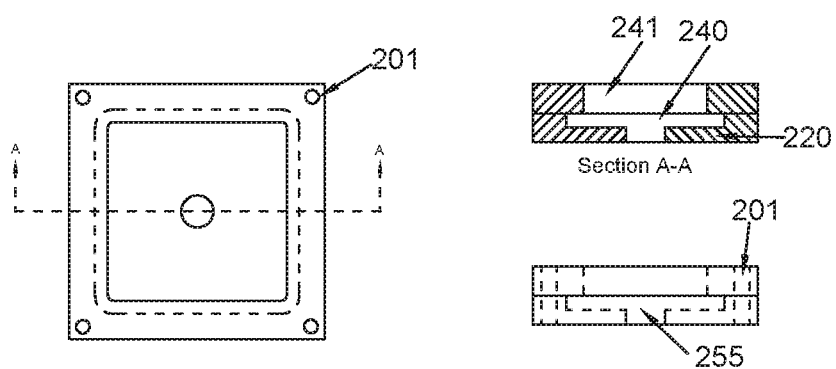
FIG. 12 shows a top view and cross-sectional side views of the build plate of FIG. 10.

In contrast to the single-part design of build plate 100, build plate 200 includes multiple parts. FIG. 11-12 demonstrate an example of how build plate 200 may be implemented with multiple parts. As depicted in FIGS. 11-12, build plate 200 includes base 280 and frame 270 configured to be attached over the base 280. The frame includes opening 241, and the base 280 includes recessed section 240.

In this example, frame 270 is used to secure solid material 160 in place during the 3D printing process to keep it from lifting from recessed section 240 during 3D printing. As illustrated by cross section A-A of FIG. 12, in example build plate 200 the recessed section 240 is wider than the frame opening 241. By virtue of this configuration, frame 270 may provide a clamping force to secure a solid material 160. This two-part design may be particularly beneficial when implemented with an insert 1100 as discussed above. Frame 700 may be used to hold down insert 1100 along the outside edges of bottom portion 1110 of insert 1100, which may curl upwards during sintering if the insert becomes too hot. Additionally, due to the insert part being cast into the exact same size cavity (e.g., in one part or two part build plates), there are frictional forces that may be relied on to hold the solid material in place, using a "press-fit" mechanism. However, when friction is not enough to hold the insert in place (e.g., such as when frictional forces are overcome by localized heating), the depicted two part design may add additional retention for the insert by pressing down on the insert's edges.

Frame 270 is removably coupled to base 280, and frame 270 may be removed from base 280 as to allow removal (or insertion) of the solid material. For example, the bottom part 1110 of insert 1100 may be first secured into recessed section 240 of base 280. Afterward, frame 270 may be secured over base 280, and the top part 1120 of insert 1100 may be secured in opening 241 of frame 270. Frame 270 and base 280 may be affixed through a number of means, including screws, set screws, pins, dovetail, sliding rails or other interlocking designs.

Figure 13A:
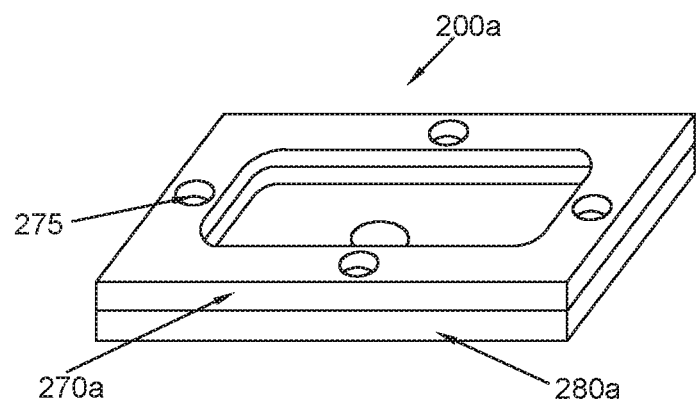
FIG. 13A shows a perspective view of a two-part build plate that can be used for 3D printing in accordance with implementations of the disclosure.
Figure 13B:
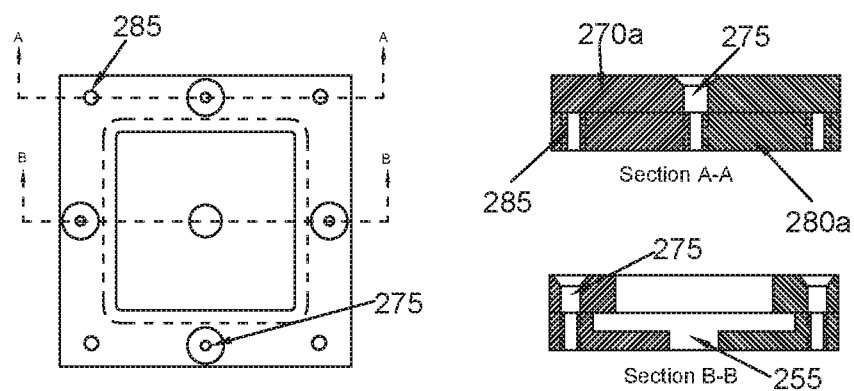
FIG. 13B shows a bottom view and cross-sectional side views of the build plate of FIG. 13A.

FIGS. 13A-13B depict a particular example implementation for affixing an example frame 270a and a base 280a of an example build plate 200a. FIG. 13A shows a perspective view of build plate 200a. FIG. 13B shows a bottom view and cross-sectional views of build plate 200a. This example utilizes recessed holes 275 in frame 270a that may extend through holes in base 280a. Utilizing appropriately sized machine screws, frame 270a and base 280a may be secured via recessed holes 275. In this implementation, recessing the screw flush or below the top surface of build plate 200a (i.e., below the top of frame 270) allows powdered metal to be deposited without interfering with metal powder bed 550 of the 3D printing system 500, described below. For example, when a wiper of system 500 levels powder across a surface of the printing surface, this may ensure that the wiper is not damaged by the protruding screw.

Build plates consisting of multiple parts, such as build plate 200, may employ various design features to ease separation of frame 270 from base 280. The build plate 200 may require separation to remove solid material 160 without melting the solid material 160. Referring again to FIGS. 13A-13B, this example demonstrates an implementation that incorporates jack screw holes 285 in a base 280a to ease separation from a frame 270a. Bolts inserted into the jack screw holes 285 and tightened can be used to push the frame 270a away from the base 280a, or to push the base 280a away from the frame 270a. Several design features may also aid in disassembly, including tabs extending from the base 280 and/or the frame 270 or a nail nick or gap for prying apart the assembly.

It should be noted that although in the examples illustrated herein the build plate 200 is composed of two parts—frame 270 and base 280, the build plate 200 may be made of more than two parts that are affixed using one or more of the aforementioned methods.

Although depicted in the shape of a rectangular prism or cuboid having sidewalls that extend perpendicularly between the top surface 210 and bottom surface 220, it should be noted that in other implementations build plate 200 may be some other suitable shape, e.g., a trapezoidal prism, that may be used to implement the 3D printing techniques described herein.

In build plate 200, means for attachment of build plate 200 to a 3D printing apparatus are represented by slots or holes 201 (e.g., bolt holes) in each corner of top surface 210. In this instance, the bolt holes 201 may extend through frame 270 and base 280. Structural protrusions (e.g., bolts or tabs) of the 3D printing apparatus may be inserted into holes 201 to hold the build plate 200 in place during 3D printing. Although holes 201 are illustrated in each corner of top surface 200, it should be appreciated that depending on the implementation, build plate 200 may include holes 201 and/or protrusions in any suitable location on top surface 210, bottom surface 220, and/or other surface of build plate 200 to facilitate attachment to the 3D printing apparatus. In some implementations, holes 201 may be included on bottom surface 220 and not on top surface 210 to prevent powdered metal from 3D printing to fall into holes 201.

As depicted, build plate 200 includes a mortised or recessed section 240 extending through its center. The recessed section 240 is illustrated as having surfaces 245 (e.g., sidewalls) and a lower surface 250. As further described below, the recessed section 240 may be filled with a lower melting temperature metal or metal alloy that provides a thermally decomposable surface for building a 3D printed object.

The recessed section 240 may be in the form of a basin with a drain hole that extends all the way through the build plate 200 (e.g., from top surface 210 through bottom surface 220). This is depicted by FIGS. 11 and 12, which show angled, top, and cross-sectional side views of build plate 200, including a recessed section 240 with a drain hole 245. As shown, the recessed section 240 is in the form of a basin that converges toward hole 245 that extends out the bottom of build plate 200, thereby permitting a material (e.g., liquid metal) to be drained out of build plate 200. In FIG. 12C, the dashed outlines depict the corner holes 201, drainage hole 255, and basin shapes. The bottom edges of the basin leading to the drainage hole are flat in this example, although they can also be sloped to allow ease of drainage.

It should be appreciated that although the examples of the disclosure show the lower surface of recessed section 240 flat, featuring a centered, circular hole 245, other basin constructions, slope angles, hole locations, and hole shapes may be utilized. For example, in some implementations, the recessed section may be implemented by perpendicularly sloping its sides into a flat bottom having a hole. In some implementations, the hole 245 may positioned off center (e.g., close to one of the corners of build plate 200). In some implementations, the hole 245 may instead drain through a side wall 230 of build plate 200. In some implementations, the hole 245 may be rectangular or square.

The recessed section 240 may be formed via any suitable machining process such as by using a morticing machine, a metal lathe, a milling machine, a drill, etc. For example, the recessed section 240 may be formed by morticing a solid block of metal. Depending on the implementation, the top perimeter and average depth of recessed section 240 may be optimized for the 3D printing device and process used with build plate 200. For example, the perimeter of the cutout may be shaped such that it does not interfere with a 3D printing device securing mechanism (e.g., providing sufficient space for holes 201) while providing a large enough surface area to form a 3D printed object. In some implementations, sufficient depth may be provided to optimize cooling and provide fora deeper channel.

Figure 14A:
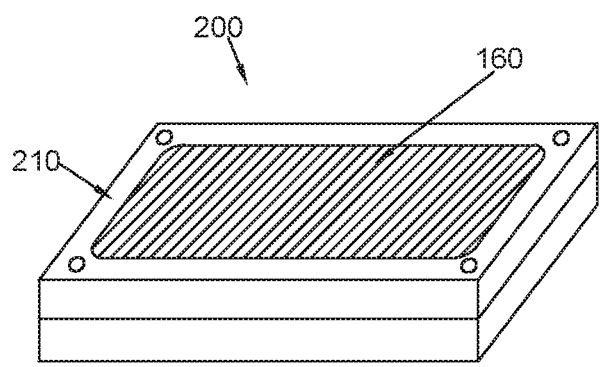
FIG. 14A shows an angled view of a two-part build plate filled by a solid material, in accordance with implementations of the disclosure.
Figure 14B:
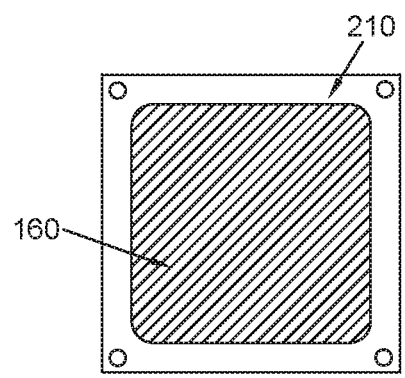
FIG. 14B shows a top view of the build plate of FIG. 14A.
Figure 14C:
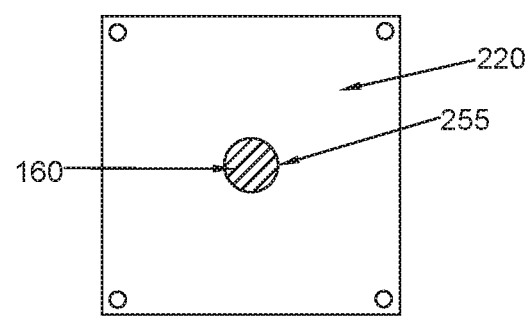
FIG. 14C shows a bottom view of the build plate of FIG. 14A.

FIGS. 14A, 14B, and 14C respectively show angled, top, and bottom views of a build plate 200 filled by a solid material 160, in accordance with implementations of the disclosure. As depicted in this example, the material filling recessed section 240 forms a flat surface flush to the top edges of the recessed section. As shown by the bottom view in FIG. 14C, the solid material 160 filling the recessed section 240 is visible through the drainage hole 255. Although in this example, the solid material 160 forms a flat surface flush at the top edges of the build plate basin, in other implementations it may lie below the top edges of the build plate basin.

In implementations, the solid material 160 is a solid metal or metal alloy having a melting point lower than that of the material (e.g., metal) of the unfilled build plate 200. The solidus temperature of the metal or metal alloy may be at least 30° C. lower than that of the build plate 200. In some implementations, the differences in melting point may be more significant. For example, in some implementations the solidus temperature of the metal or metal alloy may be at least 50° C. lower, 100° C. lower, 200° C. lower, 400° C. lower, 600° C. lower, 800° C. lower, 1000° C. lower, or even more than 1000° C. lower than the solidus temperature of the build plate 200.

Figure 15:
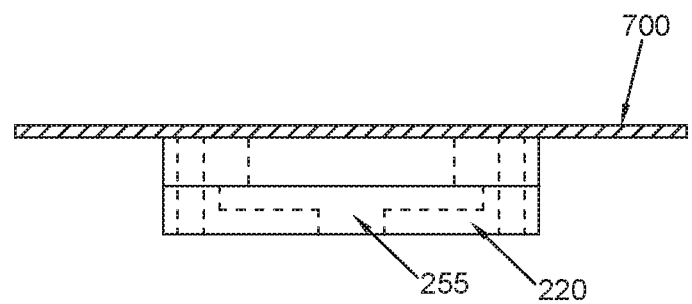
FIG. 15 depicts an example of a method of forming solid material in a recessed section of two-part build plate, in accordance with implementations of the disclosure.
Figure 16:
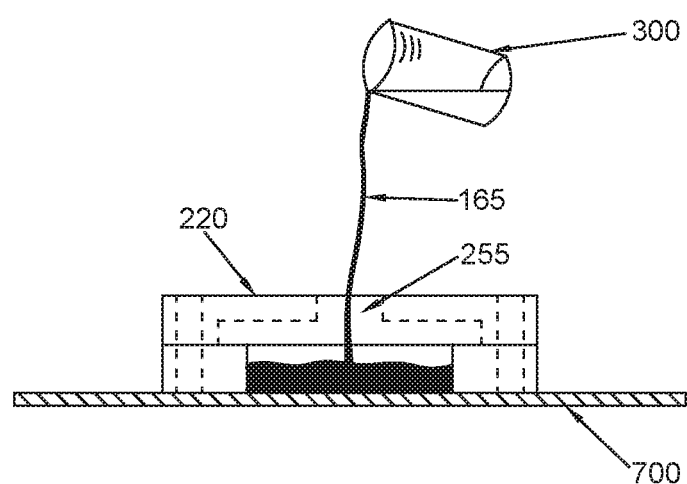
FIG. 16 depicts an example of a method of forming solid material in a recessed section of a two-part build plate, in accordance with implementations of the disclosure.

FIGS. 15-16 depict one particular example of a method of forming solid material 160 in a recessed section 240 of build plate 200, in accordance with implementations of the disclosure. As depicted by FIG. 15, which shows a side view of plate 200, a flat plate or lid 700 covers the top surface of build plate 200, extending beyond the edges of recessed section 240 and the top surface 210 of build plate 200. In other implementations, lid 700 may extend up to or just beyond the edges of recessed section 240. Lid 700 may be held in place using clamps or other suitable mechanical means to create a seal. The material of lid 700 may be comprised of a material such that it does not bond with build plate 200 but may be mechanically held in place to create an enclosed mold. For example, graphite, polytetrafluoroethylene, ceramic, cemented carbide, or some other suitable material may be used.

After the lid 700 covers the top surface of build plate 200, the build plate 200 and lid 700 may be inverted, and the recessed section 240 may be filled through drain 255. In particular, FIG. 16 illustrates a side view of the inverted build plate 200 and lid 700. A container 300 may be used to pour a liquid 165 of material (e.g., metal or metal alloy) through drainage hole 255 onto lid 700, filling the recessed section 240. Prior to this step, the metal or metal alloy may be heated above its solidus temperature to form liquid 165. In some implementations, the use of a basin with acutely sloped sides may prevent the formation of air pockets when adding a liquid metal 165 through hole 255.

In this example implementation, by virtue of adding the liquid metal 165 through hole 255 with the assembly inverted, any unwanted accumulates (e.g., dross) may float to and settle at the top of the filled recessed section (i.e., where hole 255 is), thereby ensuring a clean metal or metal alloy surface is formed where 3D printing occurs.

Once the recessed section 240 is filled, the assembly may be cooled, causing liquid 165 to solidify (e.g., to form a solid material 160). Thereafter, the lid 700 may be removed to expose a smooth, solid phase metal or metal alloy that provides a build surface for a 3D metal printed object. To facilitate removal of lid 700 and ensure a smooth surface is formed (e.g., a flat surface flush to the top edges of the build plate recess), the lid 700 may be comprised of a material, e.g. graphite, polytetrafluoroethylene, ceramic, a non-stick metal, or some material that does not bond with liquid 165, before or after the liquid 165 solidifies.

It should be appreciated that although FIGS. 15-16 depict one example technique for forming a solid material 160 in a recessed section 240 of a build plate 200 to provide a surface for a 3D printed object, other techniques are possible. For example, in some implementations a liquid metal or metal alloy may instead be poured from the opposite side, through the top surface of recessed section 240, first filling drain 255. In such implementations, a lid 700 may instead cover drain 255. In yet other implementations, drain 255 may be on the side of build plate 255 (e.g., through a side wall 230), in which case the liquid metal or metal alloy may be poured through the side wall. In yet other implementations, instead of having an operator cast the liquid metal to form solid material 160, an insert 1100 may be inserted as described above.

Figure 17:
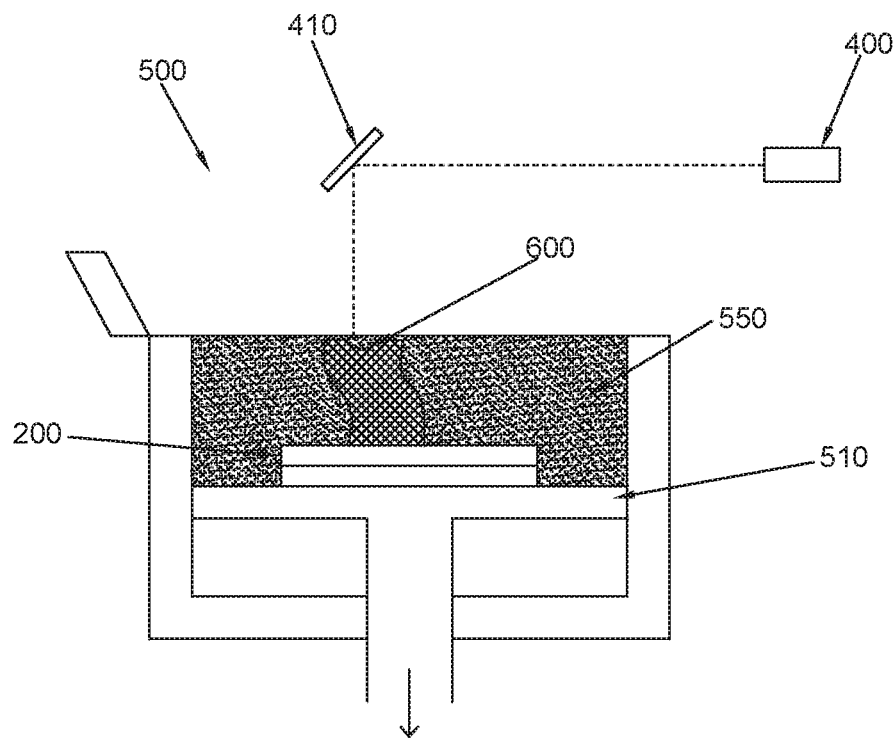
FIG. 17 illustrates a 3D metal printing process including a 3D metal printing device using a metal powder bed and a laser to form a 3D printed object on a build plate, in accordance with implementations of the disclosure.

FIG. 17 illustrates a 3D metal printing process including a 3D metal printing device 500 using a metal powder bed 550 and a laser 400 to form a 3D printed object 600 on a build plate 200, in accordance with implementations of the disclosure. Also shown is build plate loading platform 510 and optical component 410 for directing the output of a laser 400. The metal powder bed 550 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy for forming 3D printed object 600. The 3D printed object may be laser sintered. Prior to beginning printing, a build plate 200 having a top surface including a region with a low melting temperature metal or metal alloy (e.g., top surface of solid material 160 filling a recessed section 240 as depicted by FIGS. 14A-14C) may be loaded into the 3D metal printing device 500. For example, build plate 200 may be placed on a platform 510 of device 500.

At the start of printing, a first layer of metal powder may be deposited (e.g., using a doctor blade or wiper blade) over the top surface of build plate 200, including solid material 160. Laser 400 or a series of lasers may then lase/sinter the deposited metal powder, causing the first layer of 3D printed object 600 to be metallurgically joined to the solid material. Thereafter, additional layers of powdered metal may be deposited by metal powder bed 550 and 3D printed object 600 may be created layer by layer. The device 500 may include a lowering mechanism (e.g., as part of platform 510) apparatus to allow for subsequent metal layers of the 3D printed object 600 to be formed. As the apparatus and build plate are lowered, a metal powder layer may be added to the top surface and a laser or laser(s) used to selectively join/sinter areas to the 3D printed object 600 below. At the completion of the aforementioned 3D printed process, build plate 200 with 3D printed object 600 may be removed from 3D printing device 500.

The melting temperature of the metal or metal alloy that is used to form 3D printed object 600 is higher than that of the solid material 160. For example, similar to the build plate 200, the solidus temperature of the 3D printed object 600 may be at least 30° C. higher than the solidus temperature of the metal or metal alloy. In some implementations, the differences in melting point may be more significant. For example, in some implementations the solidus temperature of the 3D printed object 600 may be 50° C. higher, 100° C. higher, 200° C. higher, 400° C. higher, 600° C. higher, 800° C. higher, 1000° C. higher, or even more than 1000° C. higher than the solidus temperature of the metal or metal alloy of solid material 160. In some implementations, the metal powder used to form 3D printed object 600 may comprise aluminum, cobalt, copper, nickel, steel, stainless steel, titanium, vanadium, tungsten carbide, gold, bronze, platinum, silver alloys, cobalt-chromium alloys, refractory metals, a combination thereof, or some other suitable metal or metal alloy.

It should be noted that although 3D printing may occur at room temperature, the heat generated by laser 400 may increase the temperature of solid material 160. To prevent premature melting of material 160 during 3D printing, this increase in temperature may be accounted for when selecting a suitable metal or metal alloy 160. In some implementations, the power of laser 400 may be decreased while forming lower layers of 3D printed object 600 to prevent overheating of material 160 during 3D printing.

Figure 18:
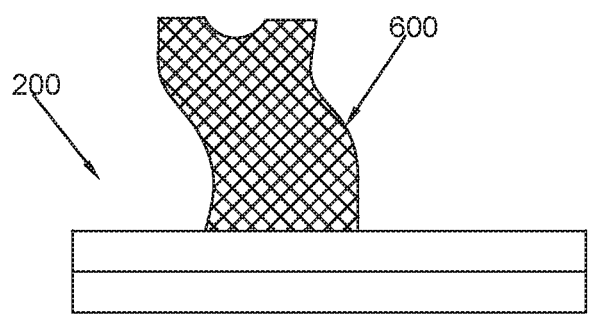
FIG. 18 shows an assembly including a metal 3D printed object metallurgically joined onto a build plate after the completion of 3D printing, in accordance with implementations of the disclosure.

FIG. 18 shows an assembly including the metal 3D printed object 600 metallurgically joined onto build plate 200 after the completion of 3D printing. In particular, the 3D printed object 600 may be joined to a surface of build plate 200 containing a low melting temperature solid material 160, as described above.

Figure 19:
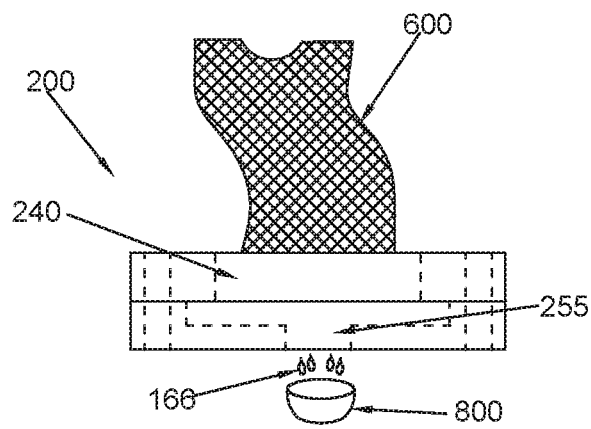
FIG. 19 shows a side view in which a low melting temperature metal or metal alloy filling a recessed section of a build plate is melting and draining through a drain hole into a collection apparatus while a 3D printed object and the build plate remain solid, in accordance with implementations of the disclosure.

Following 3D printing, the 3D printed object 600 is separated from build plate 200. To this end, the assembly may be heated (e.g., by placing the assembly in an oven) to a temperature above the solidus temperature of the low melting temperature solid material 160, thereby melting away the material and releasing the 3D printed object. FIG. 19 shows a side view in which the low melting temperature metal or metal alloy filling the recessed section 240 of the build plate 200 is melting and draining (shown as melting liquid 166) through the drain hole 255 into container or collection apparatus 800 while the 3D printed object 600 and the remaining structure of build plate 200, including recessed section 240, remain solid. During this removal process, the 3D printed object 600 may be held in place by a tool. In some implementations, this process may be incorporated into a compartment of a 3D printing assembly.

In this example, by virtue of having a collection apparatus 800 to collect the liquid metal or liquid metal alloy 166 during the phase change from solid to liquid, the collected metal or metal alloy may be reused to refill the recessed section 240 for future 3D printing operations. For example, the collected metal or metal alloy may be used to fill recessed section 240 as described above with reference to FIGS. 15-16, in preparation for printing a new 3D object.

In an alternate separation method, prior to applying heat, frame 210 may be separated from base 280, thereby exposing a top portion of solid material 160. After separating frame 210 from base 280, a thin object such as a punch may be placed though drain hole 255 on the underside of build plate 200 with significant pressure to release the solid material 160, with the 3D printed object 600 still attached, from the recessed section 240. The aforementioned combination may be placed into a container with a heated medium or subjected to other thermal treatment to cause the separation of solid metal material 160 from 3D printed object 600. This separation method may be implemented on a preformed insert as described above, or on a solid material 160 formed via casting by the operator as described in FIGS. 15-16.

Figure 20:
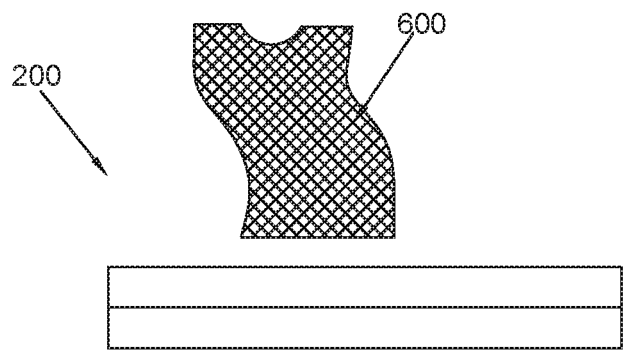
FIG. 20 depicts a 3D printed object after being separated from a build plate once the material filling recessed section is no longer solid and melted away, in accordance with implementations of the disclosure.

FIG. 20 depicts the 3D printed object 600 after being separated from build plate 200 once the material filling recessed section 240 is no longer solid and melted away. In some implementations, after separation of the 3D printed object 600, the collected metal or metal alloy may be used to refixture the object 600 for polishing, reshaping, and/or grinding, as needed. For example 3D printing parts may be held using a clamping mechanism for post processing. The lower melting point material 160 may be used to secure the 3D printed object 600 into a vice or clamping mechanism while performing the post processing functions above, so that the clamp does not contact the part 600 directly.

It should be appreciated that although the embodiments described herein have been described in the context of a build plate including a recessed section with a drain hole, it is contemplated that at least some of the techniques described herein could be implemented without a drain hole. For instance, a recessed section without a drain hole could be filled with a low melting temperature metal or metal alloy that provides a surface for 3D printing. After 3D printing, the assembly may be heated to separate the 3D printed object from the metal or metal alloy, and the liquid metal or metal alloy may be removed using any suitable means, e.g., by inverting the assembly, using a suction tube, etc.

Although described in the context of using build plates (e.g., 100 or 200) that are filled with a material 160, the techniques described in the present disclosure may also be implemented with monolithic build plates comprised only of materials (e.g., metal or metal alloy 160) having a solidus temperature that is substantially lower (e.g., at least 30° C.) than that of the 3D printed object, and which have suitable strength to undergo 3D printing. Such build plates may be made monolithically such that the entire build plate is made as one part, including any necessary holes needed to secure the build plate in the 3D printing equipment. In such implementations, the monolithic build plates may be designed for one time 3D printing use before they are melted to release the 3D printed object.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A method, comprising:
   obtaining a build plate useable in a 3D printing device, the build plate comprising: a top surface, a bottom surface, and sidewalls comprised of a material; and a recessed section formed through the top surface;
   filling the recessed section with a liquid form of a metal or metal alloy, wherein filling the recessed section with the liquid form of the metal or metal alloy comprises:
   placing a lid over the top surface of the build plate that extends over the recessed section;
   inverting the build plate with the placed lid such that a drain hole extending from the recessed section through the bottom surface of the build plate is exposed; and
   pouring the liquid form of the metal or metal alloy through the drain hole; and
   cooling the metal or metal alloy below its solidus temperature to form a solid form of the metal or metal alloy that provides a build surface for forming a 3D printed metal object in the 3D printing device, wherein the metal or metal alloy has a solidus temperature that is lower than a solidus temperature of the 3D printed metal object and lower than a solidus temperature of the material forming the top surface, the bottom surface, and the sidewalls of the build plate.

2. The method of claim 1, wherein the lid is comprised of a material that does not form a bond with the metal or metal alloy.

3. The method of claim 2, further comprising: after the solid form of the metal or metal alloy is formed, removing the lid.

4. The method of claim 1, further comprising: printing, using the 3D printing device, the 3D printed metal object onto the build surface of the solid form of the metal or metal alloy.

5. The method of claim 4, wherein the 3D printed metal object is joined metallurgically to the build surface of the solid form of the metal or metal alloy during 3D printing.

6. The method of claim 5, further comprising: heating the solid form of the metal or metal alloy above the solidus temperature of the metal or metal alloy, thereby melting the solid form of the metal or metal alloy and releasing the 3D printed metal object from the build plate.

7. The method of claim 6, further comprising: draining the melting metal or metal alloy through the drain hole.

8. The method of claim 7, further comprising: collecting the melting metal or metal alloy draining through the drain hole in a container.

9. The method of claim 8, further comprising: after draining the melting metal or metal alloy through the drain hole, refilling the recessed section with a refill liquid metal or metal alloy.

10. The method of claim 9, wherein the refill liquid metal or metal alloy comprises the metal or metal alloy collected in the container.

* * * * *